Figure 1:
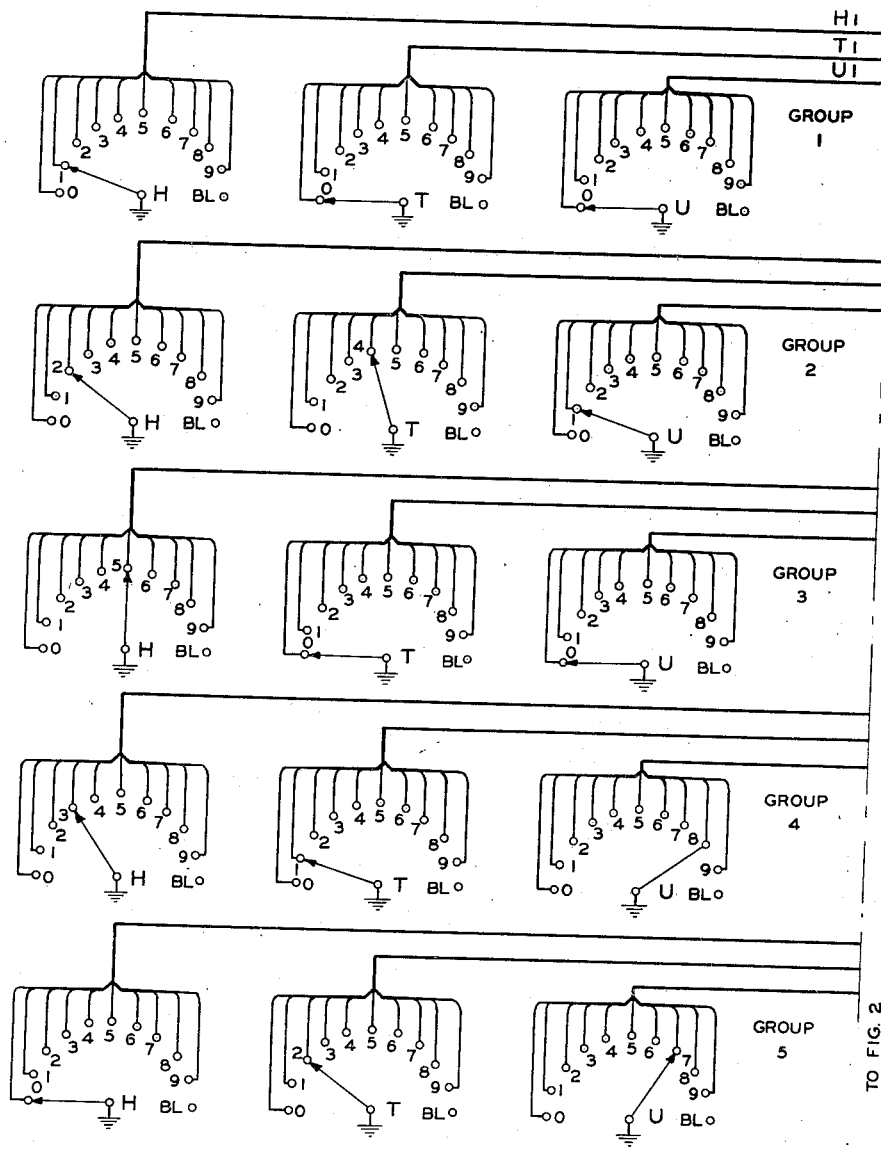

March 23, 1937.　　　J. A. HERBST　　　2,074,392

NUMERICAL COMPARATOR

Filed May 27, 1933　　　7 Sheets-Sheet 1

INVENTOR
J. A. HERBST
BY
ATTORNEY

March 23, 1937.     J. A. HERBST     2,074,392
NUMERICAL COMPARATOR
Filed May 27, 1933     7 Sheets-Sheet 3

INVENTOR
J. A. HERBST
BY *M. J. Reynolds*
ATTORNEY

March 23, 1937.  J. A. HERBST  2,074,392
NUMERICAL COMPARATOR
Filed May 27, 1933　　　7 Sheets-Sheet 4

GROUP 1

GROUP 2

INVENTOR
J. A. HERBST
BY *MJReynolds*
ATTORNEY

March 23, 1937.　　　J. A. HERBST　　　2,074,392
NUMERICAL COMPARATOR
Filed May 27, 1933　　　7 Sheets-Sheet 5

INVENTOR
J. A. HERBST
BY
ATTORNEY

March 23, 1937.  J. A. HERBST  2,074,392
NUMERICAL COMPARATOR
Filed May 27, 1933  7 Sheets-Sheet 6

INVENTOR
J. A. HERBST
BY M. J. Reynolds
ATTORNEY

March 23, 1937.  J. A. HERBST  2,074,392
NUMERICAL COMPARATOR
Filed May 27, 1933  7 Sheets-Sheet 7

INVENTOR
J. A. HERBST
BY
M. J. Reynolds
ATTORNEY

Patented Mar. 23, 1937

2,074,392

UNITED STATES PATENT OFFICE 2,074,392

NUMERICAL COMPARATOR

John A. Herbst, Rivervale, N. J., assignor to The Teleregister Corporation, New York, N. Y., a corporation of Delaware Application May 27, 1933, Serial No. 673,191

14 Claims. (Cl. 177—311)

This invention relates to a numerical comparator and more particularly to means for comparing a number, which may comprise a plurality of digits, with another number unknown to the operator, to determine the numerical relation of the numbers so compared.

For instance in the accounting system of a department store or the like, embracing charge accounts, the various charge account customers are usually given a credit rating, that is, a limit is placed on the amount which the customer may charge during a given period. The usual method is to have the clerk, when making a sale, telephone the bookkeeper or accountant, who investigates the customer's ledger sheet and reports back to the clerk whether or not the charge may be made. Similarly in banks and other institutions the teller or cashier may desire to know the relation between a depositor's balance and a check or other paper presented for payment, and in brokerage houses it may be desired to compare the result of a customer's transaction with his margin account or to compare the fluctuating prices of stocks or other commodities with the broker's limit buying or selling orders.

One of the objects of the present invention is to provide a system for use in such cases to enable the clerk or teller to make such comparison quickly, simply and accurately.

Another object is to provide means for comparing any number with a previously determined number to ascertain whether the first number is numerically higher, lower or the same as the previously determined number.

A further object is to compare a number with two previously determined numbers to ascertain whether the first number is higher than the higher of the two previously determined numbers, lower than the lower one thereof, or numerically the same as either or between the two.

More specifically one of the objects is to provide a limit order device for use by brokers and others by which the fluctuating prices of stocks, bonds, commodities or the like, may be compared with the broker's "buy" or "sell" limit order, or with a previously established high or low price of the commodity to determine whether the limit order price has been reached or exceeded, or whether a new high or low price has been established.

Numerous other advantages will be apparent from the detailed description of the invention given hereinafter.

In accordance with one embodiment of my invention I provide each clerk or other person desiring to obtain the comparison, with a keyboard or similar selectively operable means by which a previously determined number may be selected from a plurality of previously determined numbers and compared with a second number and a signal or other indicator associated therewith for immediately indicating to the clerk the numerical relation of the numbers to each other. Remote from the clerk's position is a selecting mechanism responsive to the number set up on the keyboard for comparing the same with a number previously set up in the selecting mechanism, and for operating the indicator or indicators in accordance with the result of such comparison.

Figure 2:
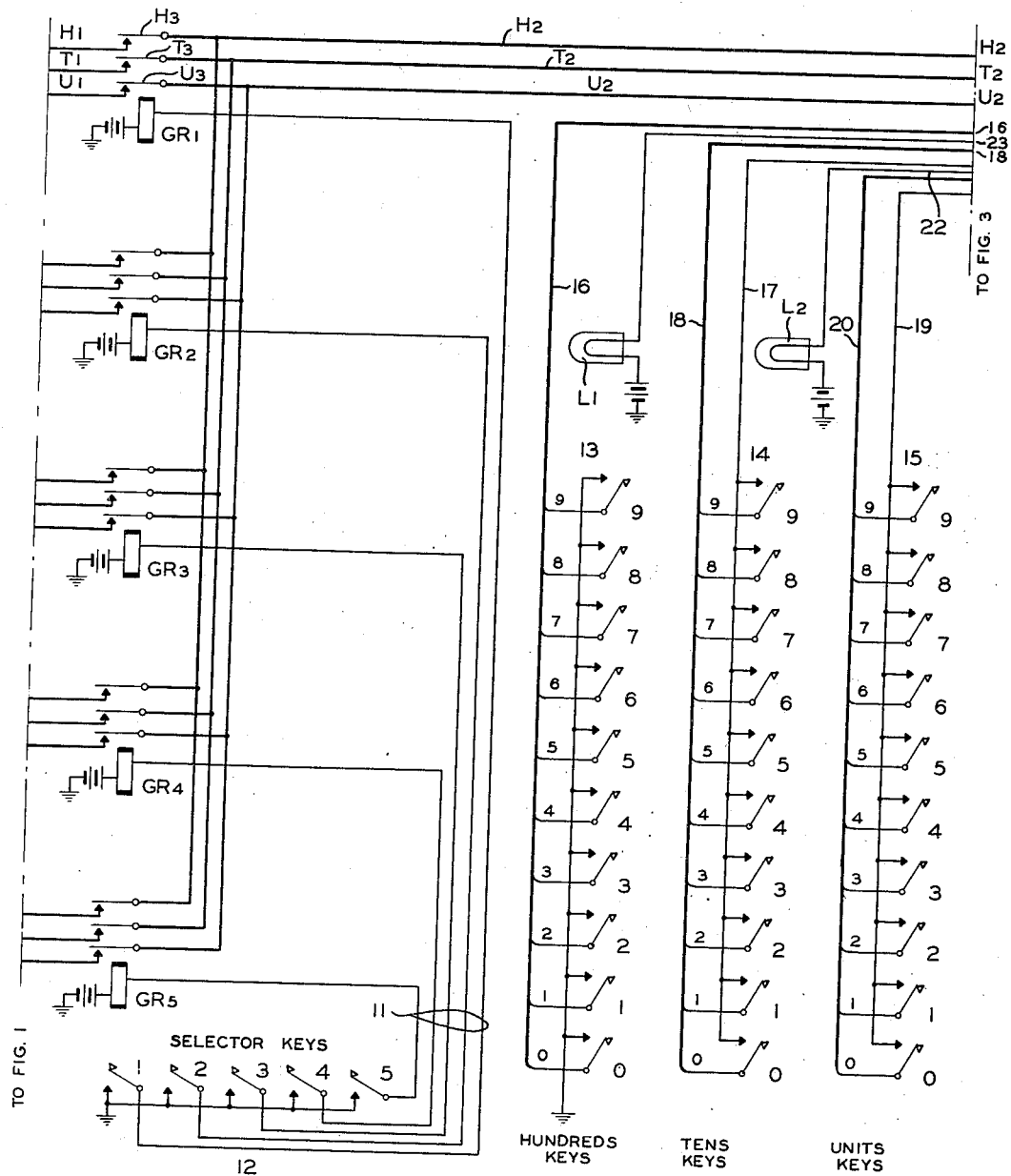
Figure 3:
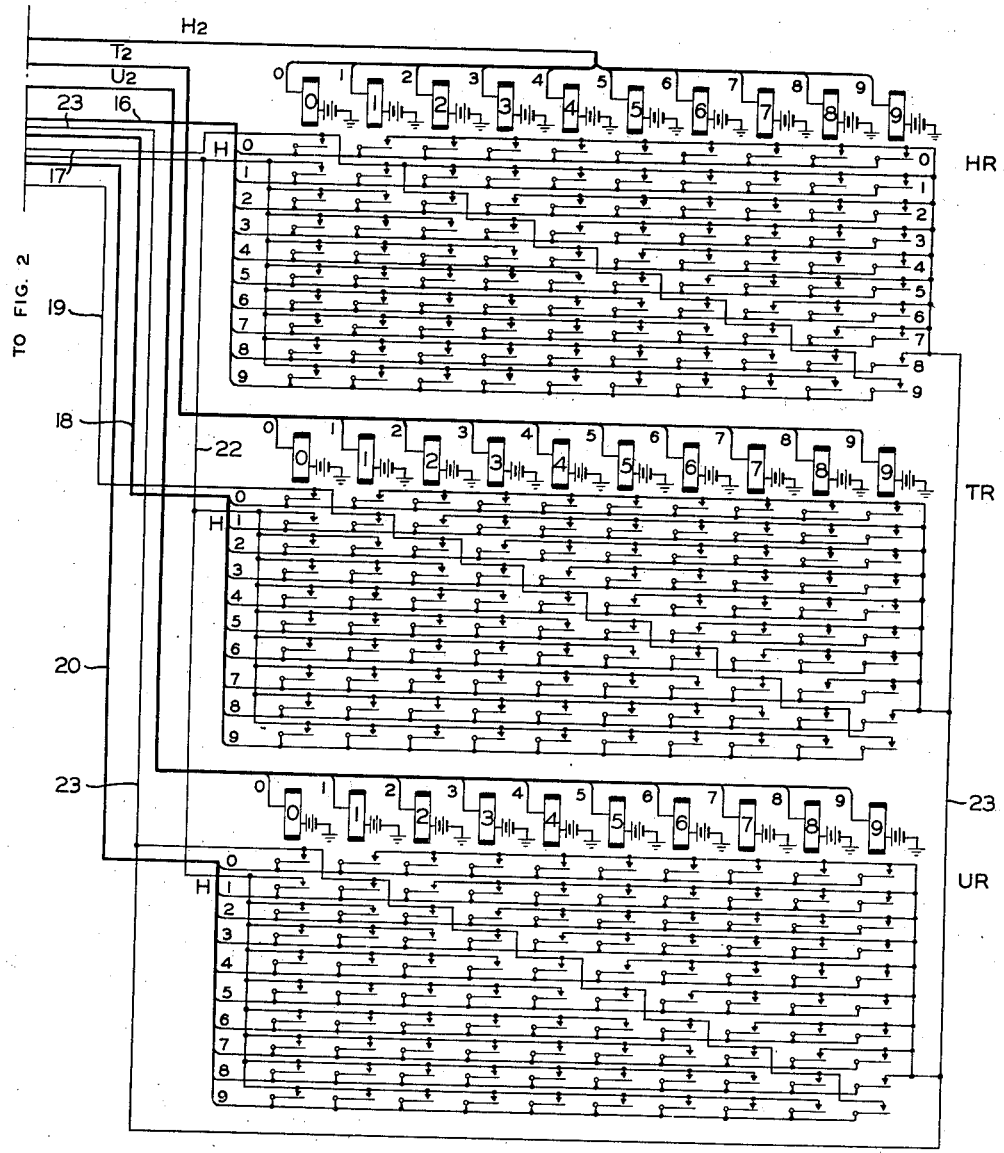

The invention will best be understood by reference to the accompanying drawings in which:

Figures 1, 2 and 3 show, collectively, an electrical system for comparing a number with a previously determined number, as for instance a customer's credit balance, to determine whether the first number is higher, lower or the same as said credit balance; Figure 1 illustrating the selective mechanism for setting up the predetermined numbers; Figure 2 illustrating the clerk's keyboard mechanism and signal devices for making the comparison with any one of a plurality of previously determined numbers, and Figure 3 illustrating the selecting mechanism which responds to numbers set up in the apparatus of Figures 1 and 2, and controls the signal devices in accordance with the result of the comparison.

Figure 4:
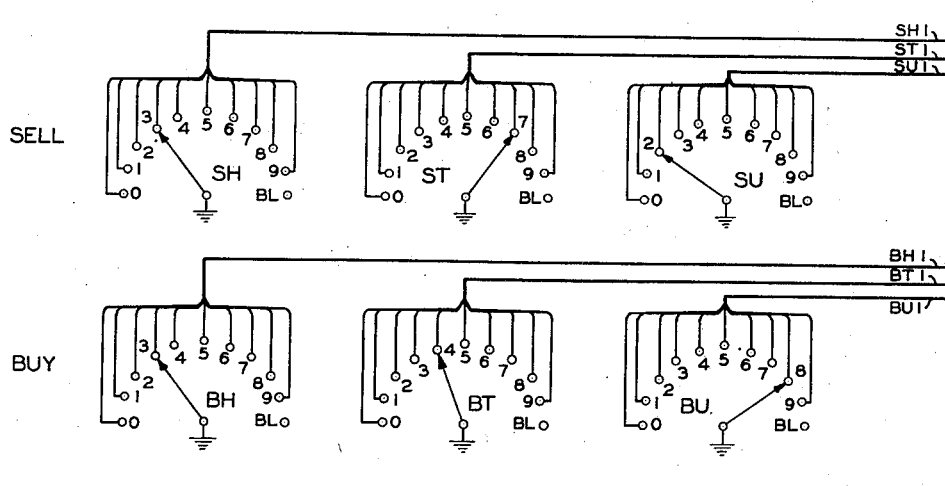
Figure 4:
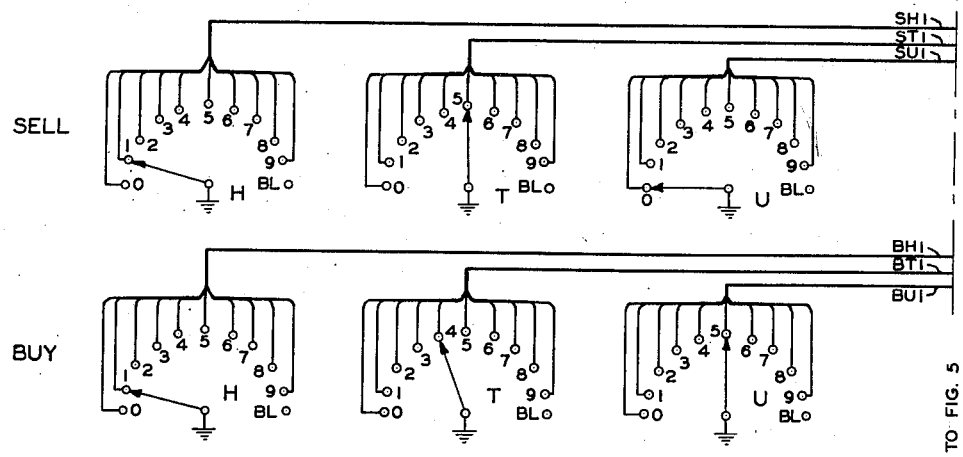
Figure 5:
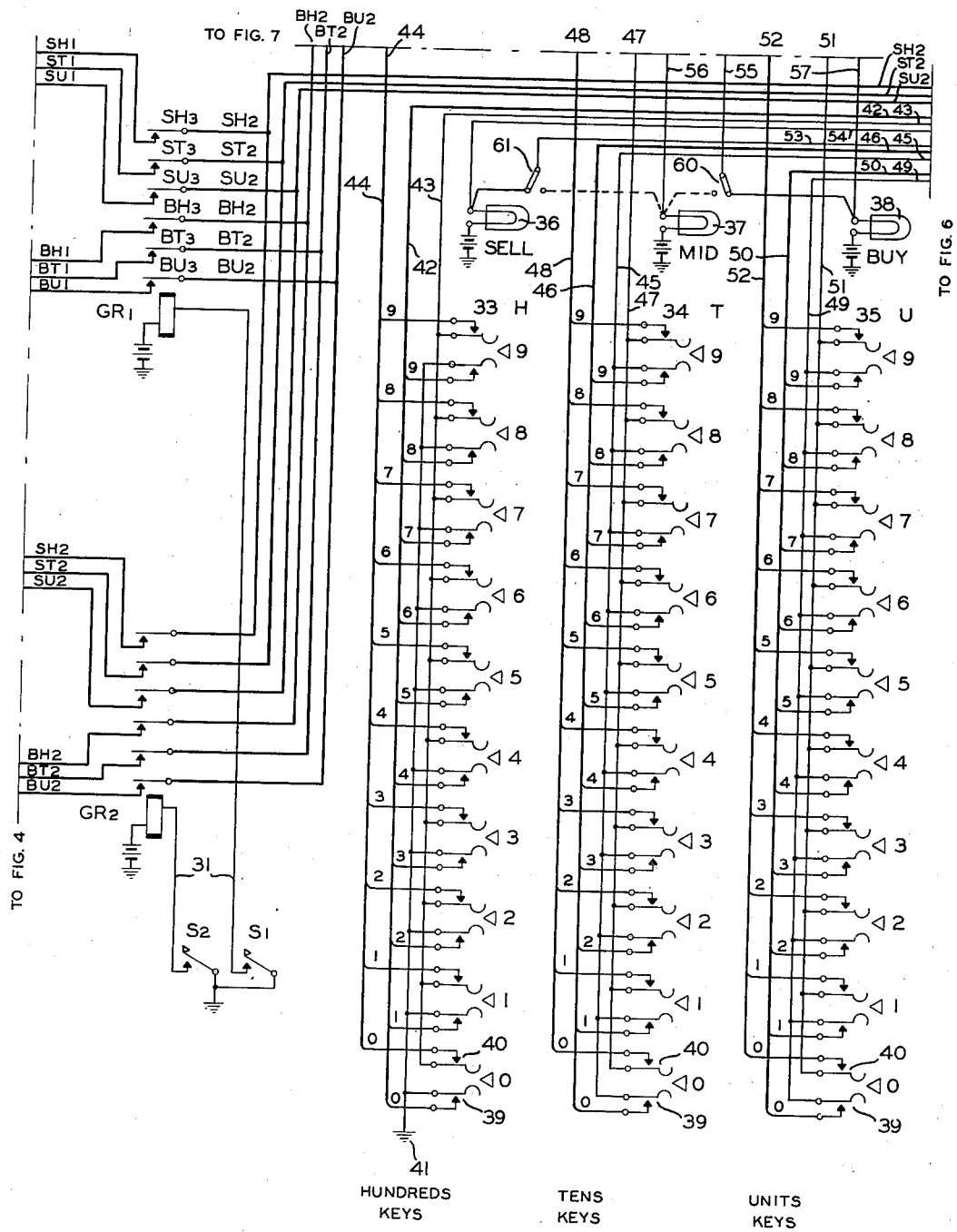
Figure 6:
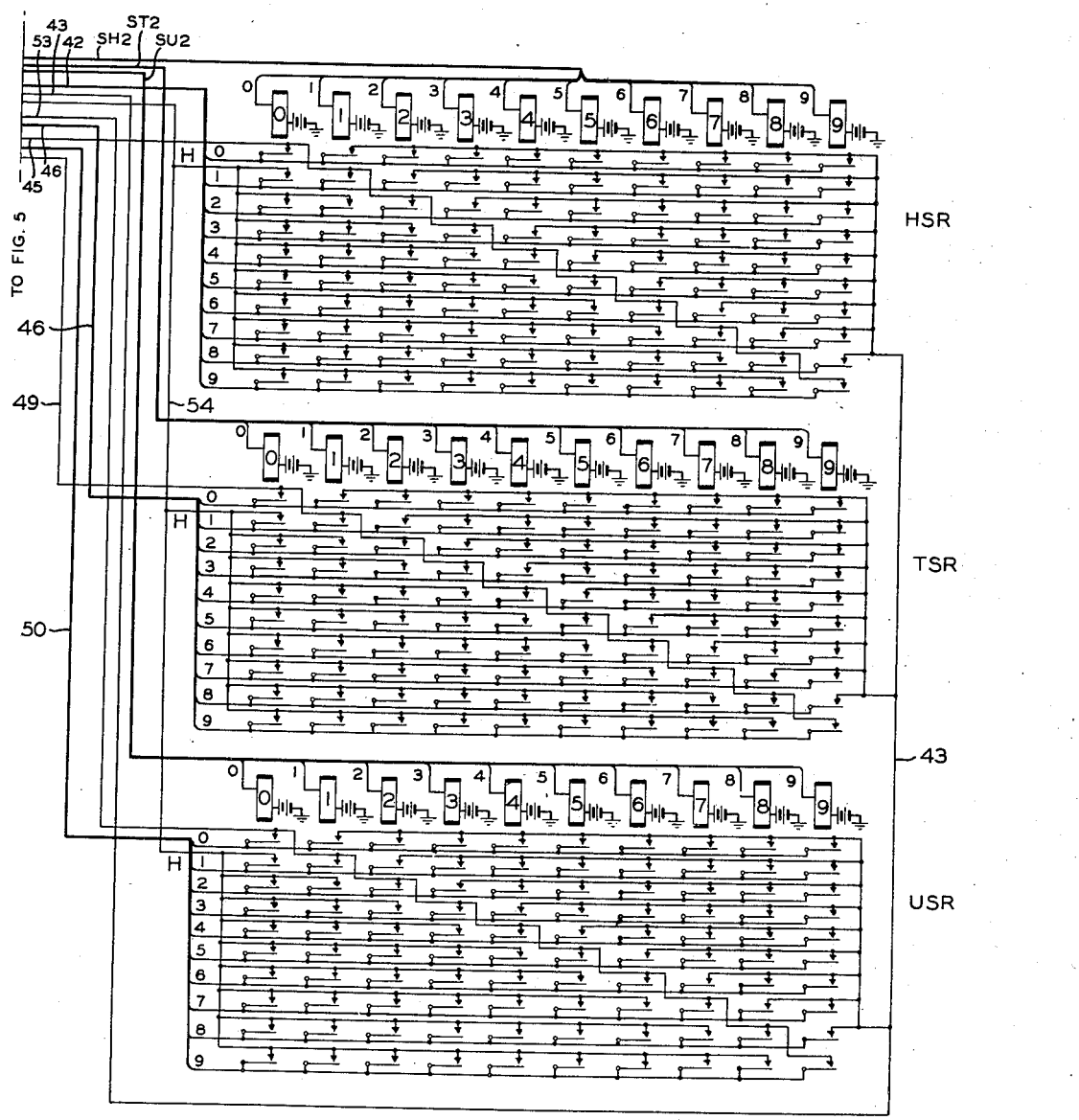
Figure 7:
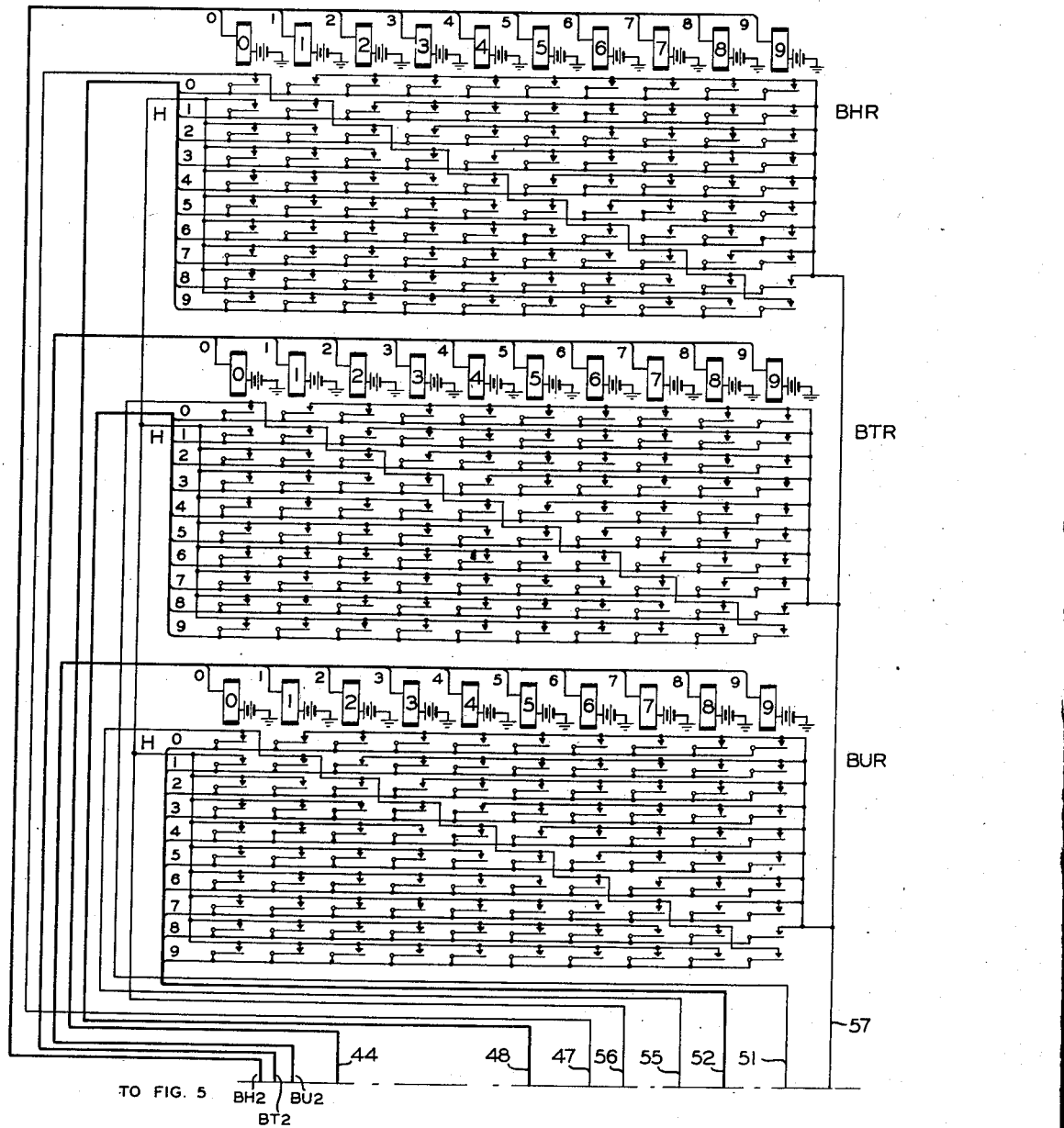

Figures 4, 5, 6 and 7 show, collectively, a broker's limit order system for comparing fluctuating stock prices with two previously determined numbers which may be previous high or low values of the stock or commodity or customer's limit orders to buy and sell the same, to determine whether the stock price is higher than the higher of the two previously determined numbers, lower than the lower one thereof, equal to either thereof, or intermediate in value thereto; Figure 4 illustrating the mechanism for setting up groups of two previously determined numbers; Figure 5 illustrating keyboard and signal means at the clerk's position for making the comparison with any one of a group of two previously determined numbers; Figure 6 illustrating the selective mechanism for comparing the number set up on the keyboard with the higher of the two previously determined numbers, and Figure 7 illustrating the selective mechanism for comparing the numbers set up on the keyboard with the lower of the previously determined numbers.

Referring first to Figure 1, I have shown a number of groups (5 in the present case) of switches. Each group of switches may by way of example correspond to an individual customer's credit account. Each group consists of three switches H, T and U, representing the hundreds, tens and units digits respectively of a number, representing the amount in dollars of the customer's credit balance. It is to be understood, however, that any number of switches may be used, depending upon the order of magnitude of the numbers to be compared.

Each of the switches H, T and U have ten contacts numbered 0 and 1 to 9, which are connected by individual conductors 10, bundled into the cables H1, T1 and U1 respectively, through the contacts of gang relays GR1 to GR5, to a second group of cables H2, T2 and U2, respectively. The circuits for each of the groups of switches shown in Figure 1 are the same, and, therefore, only that associated with group 1 will be described specifically hereinafter. The relay GR1 is provided with thirty contacts, three only, namely H3, T3 and U3, of which are shown and each of which represents a bank of ten contacts. The relays GR1 to GR5 are controlled over conductors 11 through a group of selector keys 12, one of which is individual to each relay.

The selector keys 12, together with a group of ten hundreds keys 13, ten tens keys 14 and ten units keys 15 form the clerk's keyboard mechanism. Associated with the keyboard mechanism are two signal lamps L1 and L2, the former indicating that the number to be compared is lower than or the same as the previously determined number and the latter indicating that the number being compared is higher than the previously determined number.

The fixed contacts of the hundreds keys 13 are grounded and the movable keys numbered 0 and 1 to 9 are connected to individual conductors bundled ito a cable 16. The fixed contacts of the tens keys 14 are connected to a common conductor 17 and the movable keys are connected to individual conductors bundled into a cable 18. Similarly the fixed contacts of the units keys 15 are connected to a common conductor 19 and the movable keys are connected to individual conductors bundled into a cable 20.

Referring now to Figure 3, the cable H2, which will complete circuits through the contacts of the GR relays to one of the hundreds switches in Figure 1, is fanned to the windings of the hundreds multi-contact relays HR, numbered 0 and 1 to 9 respectively. Similarly cable T2 is fanned to the windings of the tens multi-contact relays TR and the cable U2 is fanned to the windings of the units multi-contact relays UR1 in such manner that when the gang relay GR1 is operated, each of the contacts of the hundreds, tens and units switches H, T and U respectively, of Figure 1 is connected directly by an individual conductor to the correspondingly numbered relay of the hundreds, tens and units groups HR, TR and UR respectively, in Figure 3. Ground is connected to the movable arms of the switches H, T and U of Figure 1 and grounded battery is connected to the winding of each of the hundreds, tens and units relays HR, TR and UR of Figure 3. Consequently with the hundreds, tens and units switches H, T and U of group 1 in any previously determined position, one relay of each of the hundreds, tens and units groups HR, TR and UR of Figure 3 will be operated, whenever the gang relay GR1 of Figure 2 is energized. The setting of the arms of switches H, T and U corresponds to a customer's credit balance. For instance the switches in group 1 are set to indicate a credit balance of one customer of $100; those in group 2 to the credit balance of a different customer of $241; those in group 3 to a still different customer's balance of $500, etc.

Referring again to Figure 3, it will be noted that each relay is provided with ten contacts arranged in a vertical row and numbered 0 and 1 to 9. The 0 tongues of all relays of the hundreds group HR are connected together by a conductor 0 forming one element of the cable 16, associated with the 0 key of the hundreds group 13 at the keyboard. Likewise the tongues of groups 1 to 9 of the relays of the hundreds group HR are connected through the cable 16 to the correspondingly numbered keys of the hundreds bank 13. The diagonal row of fixed or front contacts of the hundreds relays beginning with the 0 contact of the 0 relay and ending with the number 9 contact of the number 9 relay, are all strapped together and connected to the common conductor 17, terminating at the fixed contacts of the tens keys 14. All the front contacts of the hundreds relays to the left of this diagonal row are joined together and connected by conductor 22 to the signal lamp L2, the opposite terminal of which is grounded through battery. Likewise all of the front contacts of the hundreds groups to the right of the diagonal row are joined together and connected by conductor 23 to the signal lamp L1, the opposite terminal of which is grounded through battery.

In a like manner the 0 and 1 to 9 tongues of all relays of the tens group TR are connected by individual conductors through the cable 18 to the correspondingly numbered keys of the tens group 14 of the keyboard in Figure 2. The diagonal row of fixed or front contacts of the tens relays extending from the 0 contact of the 0 relay to the 9th contact of the number 9 relay are joined together through conductor 19 to the fixed contacts of the units keys 13 at the keyboard. The fixed contacts to the left of the diagonal row are connected to the common conductor 22 and those to the right of the diagonal row are connected to the conductor 23.

The 0 and 1 to 9 tongues of the relays of the units groups UR are likewise connected through individual conductors by way of cable 20 to the correspondingly numbered movable keys of the units bank at the keyboard. The diagonal row of fixed contacts, extending from the 0 contact to the 0 relay to the 9th contact of the number 9 relay are connected to the conductor 23. The fixed contacts to the left of the diagonal row are connected to the conductor 22 and those to the right thereof to the conductor 23.

With these circuits in mind the operation of the system will be described.

As previously stated, the switches in group 1 upon which the customer's credit balance is set up are in a position representing a credit allowance of $100, that is, the arm of the hundreds switch is on the No. 1 contact and the arms of the tens and unit switches are both on their 0 contact. Assume now that a customer whose credit balance has been set on this group wishes to make a purchase of an amount less than his credit balance, for instance, $99: In order to determine whether the amount of the purchase is within the credit balance of the customer, the clerk depresses the customer's selector key (No. 1 in this case) operating the gang relay GR1, the 0 key of the hundreds group 13, and the number 9 key of each of the tens and units groups 13 and 15. The operation of relay GR1 closes the contacts H3, T3 and U3, thereby applying ground at the hundreds switch H over contact 1 and the conductor connected thereto through cables H1 and H2 to the No. 1 relay of the hundreds bank HBR shown on Fig. 3, thereby operating the same and closing the contacts thereof. Similarly ground is applied to the 0 contacts of the tens and units switches of group 1, through the cables T1, T2 and U1 and U2 to operate the 0 relays of the tens and units groups of Fig. 3, thereby closing the contacts of these relays. The circuit for the signal lamp $L_1$, indicating that the amount set up on keys 13, 14, 15 is less than or equal to that set up on the switches of group 1, may then be traced from ground at the 0 contact of the hundreds bank 13 of keys through the 0 key to the 0 conductor of cable 16 and thence to the 0 tongues of all of the relays of the hundreds group HR, the circuit being continued through the tongue of the No. 1 relay of the hundreds group and conductor 23 directly to the signal lamp $L_1$, indicating that the amount set up on the keys 13, 14 and 15 is not greater than the amount set up upon the switches of group 1. The clerk therefore knows that the sale may be made. The closing of the No. 9 key of the tens and units group performed no useful function at this time since the values of the hundreds digit set up on the keys 13 was less than the value of the hundreds digit set up on switches H of group 1.

Assume now that the amount of the sale just equals the amount of the customer's credit balance, that is, that the sale price is $100. In this case the No. 1 selector key of group 12 would be operated as before, to cause the energization of No. 1 relay of the hundreds group HR and the 0 relays of the tens and units groups TR and UR of Figure 3. Also the No. 1 key of the hundreds bank 13 and the 0 keys of the tens and units banks 14 and 15 would be depressed. The circuit for the lamp $L_1$ may then be traced from ground through the number 1 key of the hundreds group 13 over the No. 1 conductor of cable 16 to the No. 1 tongues of the relays of the hundreds group HR, thence through the No. 1 contact of relay 1 to conductor 17, the circuit being continued on Fig. 2 to the 0 key of the tens group 14 and by the 0 wire of cable 18 to the 0 tongues of the tens relay group TR and thence by way of the 0 contact of the 0 relay to conductor 19, from which the circuit is extended to the 0 key of the units group and through the 0 conductor of cable 20 to the 0 tongues of the units relays from which point the circuit continues over the 0 contact of the 0 relay and conductor 23 to the lamp $L_1$ and to battery.

It will be noted, therefore, that the lamp $L_1$ operates whenever the amount set up on the keys is less than or equal to the amount set up on the selected switches of group 1.

Assume now that the amount of the sale is greater than the amount of the customer's credit balance, for instance, $101. In such case the No. 1 key of the hundreds group 13, the 0 key of the tens group 14 and the No. 1 key of the units group 15 would be depressed. The signaling circuit in this case would extend from the ground at the No. 1 key of the hundreds group through the No. 1 conductor of cable 16 to the No. 1 tongues of the relays of the hundreds group HR and through the No. 1 contact of relay No. 1 to conductor 17, thence through the 0 key of the tens group 14 and the 0 conductor of cable 18 to the 0 tongues of the tens group of relays TR, thence through the 0 contact of the 0 relay of the tens group to conductor 19 and by way of No. 1 key of the units group and the No. 1 conductor of cable 20 to the No. 1 tongues of the relays of the units group UR, the circuit being continued through the No. 1 contact of the 0 relay of the units group to conductor 22 and thence through the signal lamp $L_2$ to grounded battery, thereby indicating that the customer's balance is less than the amount of the purchase and advising the clerk that the sale should not be completed.

Similarly the credit balances of any of the customers represented by groups 2, 3, 4, 5, etc., can be compared by closing the appropriate selector key 12 and the digit keys 13, 14 and 15 corresponding to the amount of the desired purchase. If the switches of group 2 are selected, the lamp $L_1$ will light whenever the amount set up on the keys 13, 14 and 15 is equal to or less than 241 and the lamp $L_2$ will light whenever the amount is greater than 241.

Reference will now be had to Figs. 4, 5, 6 and 7 which may be considered to represent a system for ascertaining whenever the fluctuating prices of stocks or other securities or commodities has attained or exceeded the value of the orders which the broker has received to buy or sell the stock or commodity. For instance, when a broker receives an order to buy a certain stock at a set price, it is necessary that he follow the trend of the market closely so that the order may be filled as soon as the market value of the stock reaches the price set by the customer. With a large number of such orders it becomes a matter of some difficulty to keep accurate account of all of the orders and fill them at the proper time. With the system shown in Figs. 4 to 7 this may be readily accomplished.

Referring first to Fig. 4, I have shown a number of groups of switches, each group having a hundreds, tens and units switch, SH, ST, and SU, respectively, representative of "sell" orders, and a corresponding hundreds, tens and units switch BH, BT and BU, respectively, representative of "buy" orders, each group representing an individual stock or commodity. Whenever the broker receives a request to buy or sell the stock represented by group 1, the order is compared with the market price of the stock and if closer to the market than any other orders previously received, the price of the order is set up on the "buy" or "sell" switches of the group 1 stock. For instance, if the market price of a particular stock is 365 and an order to sell at 372 is received, this order is set up on the "sell" switches provided no other "sell" order closer to the market has been received. Similarly, if an order to buy at 348 is received, this order, if closest to the market, is set up on the "buy" switches. The switches of group 1 are shown in such positions to indicate an order to sell at 372 and an order to buy at 348. The group 2 switches are set for an order to sell the stock represented thereby when the market reaches 150 and to buy when it reaches 145.

Each of the switches SH, ST, SU, BH, BT and BU of groups 1 and 2 have ten contacts numbered 0, and 1 to 9, which are connected by individual conductors bundled into the cables SH1, ST1, SU1, BH1, BT1, and BU1 respectively, through the contacts of the gang relays GR1 and GR2 respectively, to a second group of cables SH2, ST2, SU2, BH2, BT2 and BU2. The circuits for each group of switches shown in Fig. 4 are the same and therefore only that associated with group 1 will be described. The relay GR1 is provided with 60 contacts, six only of which are shown, namely SH3, ST3, SU3, BH3, BT3 and BU3, and each of which represents a bank of ten contacts, one individual to each conductor of each cable. The relays GR1 and GR2 are controlled over conductors 31 through a group of selector keys S1 and S2 forming part of the order clerk's keyboard.

In addition to the keys S1 and S2 the keyboard includes a group of ten hundreds keys 33, ten tens keys 34 and ten units keys 35. Also associated with the keyboard mechanism are three signal lamps 36, 37 and 38. Lamp 36 indicates that the number set up on the keyboard is equal to or greater than the number set up on the "sell" group of switches. Lamp 37 indicates that the price set up on the keyboard is between the number set up on the "buy" and "sell" switches, and lamp 38 indicates that the number set up on the keyboard is equal to or less than the number set up on the "buy" switches.

The hundreds, tens and units keys 33, 34 and 35 each control two pairs of contacts, the lower pair 39 of each key being provided to control the comparison of the number set up on the keyboard with the number set up on the "sell" group of switches, and the upper pair 40 controlling the comparison of the number on the keyboard with that set up on the "buy" switches. The movable or spring contacts of the lower pair 39 of each key of the hundreds group 33 are grounded at 41. The fixed contact of each pair 39 is connected by an individual conductor bundled into a cable 42. The movable or spring contacts of the hundreds pairs 40 are connected to a common conductor 43 and the fixed or uppermost contacts of each pair 40 of the hundreds keys are connected to individual conductors bundled into the cable 44. In the tens group 34 the movable contacts of pairs 39 are connected to a common conductor 45 and the fixed contacts of the pairs 39 are connected to individual conductors bundled into the cable 46. Likewise the movable contacts of the pairs 40 of each of the tens keys are connected to the common conductor 47 and the fixed contacts of pairs 40 are connected to individual conductors bundled into the cable 48. In a similar manner the movable contacts of each pair 39 of the units keys 35 are connected to a common conductor 49 and the fixed contacts of each pair 39 are connected to individual conductors bundled into the cable 50. The movable contacts of pairs 40 of the units switches 35 are connected to an individual conductor 51 and the fixed contacts of each of the pairs 40 are connected to individual conductors bundled into the cable 52.

The cables SH2, ST2, SU2, 42, 46 and 50 and the conductors 43, 45 and 49 extend to the relay selectors shown in Figure 6 which control the comparison of the numbers set up on the keyboard with the numbers set up on the "sell" switches of Figure 4, and reference will now be had to Figure 6.

The conductors of the cable SH2 are fanned to one terminal of the windings of the hundreds "sell" relays HSR and the conductors of cables ST2 and SU2 are fanned to the relays of the tens group TSR and units group USR respectively. The contacts and tongues of each of the three groups are connected in the same manner as described with reference to Figure 3. Each level of tongues of the hundreds relays HSR and of the tens and units relays TSR and USR are connected together and bundled into the cables 42, 46 and 50 respectively. The diagonal row of fixed contacts extending from the contact of the zero relay to the number 9 contact of the ninth relay of the hundreds group HSR are connected to conductor 45 and the corresponding contacts of the tens and units groups TSR and USR are connected to conductors 49 and 53 respectively. The fixed contacts of each group to the left of the diagonal row referred to are connected to the common conductor 54 extending to the "sell" lamp 36 and the fixed contacts of each group of relays to the right of the diagonal row are connected to conductor 43 extending to the spring contacts of the pairs 40 of the hundreds keys 33.

The relay selector shown in Figure 7 for comparing the number set up on the clerk's keyboard with the "buy" switches will now be referred to. The cables BH2, BT2 and BU2 have their conductors fanned to the winding of the individual relays of the hundreds, tens and units group of relays BHR, BTR and BUR respectively. The movable tongues of the hundreds group of relays BHR of each level are connected by individual conductors bundled into the cable 44 and those of the tens and units relays BTR and BUR are bundled into the cables 48 and 52 respectively. The diagonal row of fixed contacts of the hundreds relays BHR are connected to the common conductor 47 and those of the tens and units relays BTR and BUR are connected to the common conductors 51 and 55 respectively. The contacts to the left of the diagonal row of each bank of relays are connected to a common conductor 56 terminating at the lamp 37 (Fig. 5) and the contacts to the right of the diagonal row of each bank of relays are connected by conductor 57 to the "buy" lamp 38. Battery is applied to the opposite terminals of each of the lamps 36, 37 and 38.

With the above circuit arrangements in mind the operation of the system will be described with reference to a particular example.

Assume that orders have been received by the broker to sell the group 1 stock at a price of 372 and to buy the same at a price of 348, and these prices have therefore been set up in the "sell" and "buy" switches of group 1. The order clerk or the keyboard operator follows the fluctuating prices of the stocks through the ticker tape and as a change occurs in each stock for which the broker has orders, the operator sets up the new price of the stock on the keyboard. Assuming now that a sale occurs in the stock represented by group 1 at a price of 350, the keyboard operator depresses keys 3, 5 and 0 in the hundreds, tens and units columns 33, 34 and 35 respectively and the key S1 representative of the group 1 stock. The closing of key S1 energizes relay GR1 which closes its contacts and thereby applies ground from the switch arms of the "sell" and "buy" switches of group 1 through the cables SH1 to BU1 to the relays HSR, to BUR, (Figs. 6 and 7) corresponding to the particular contacts upon which the arms of the "sell" and "buy" switches rest. In the example assumed the numbers 3, 7 and 2 relays of the groups HSR, TSR and USR respectively will be operated and the numbers 3, 4 and 8 relays of groups BHR, BTR and BUR respectively will be operated to close their contacts.

Since the price of the stock set up on the keyboard is between the "buy" and "sell" prices represented by the switches of group 1, the mid lamp 37 should operate. The circuit for this lamp may be traced from ground 41 through the contacts of pair 39 of the number 3 hundreds key, to the number 3 conductor of cable 42, the circuit being continued in Fig. 6 to the number 3 row of tongues of relays HSR through the contacts of the number 3 relay, the diagonal conductor 45, the contacts of pair 39 of the number 5 tens key, the number 5 conductor cable 46 and thence to the fifth row of tongues of relays TSR and the corresponding contact of the number 7 relay of this group to conductor 43 and thence to the contacts of pair 40 of the hundreds key 3, to the number 3 conductor of cable 44 and thence in Fig. 7 to the number 3 row of tongues of the hundreds relays BHR and the contact of the number 3 relay thereof to the diagonal conductor 47 and by way of the contacts of pair 40 of the tens key 5 to the fifth conductor of cable 48 and thence through the fifth row of tongues of the tens relays BTR in Fig. 7 and the contact of the number 4 relay of this group to the conductor 56 and through the lamp 37 to grounded battery. The operation of lamp 37 indicates to the operator that the current price of the stock is between the "buy" and "sell" orders.

Now assume that the price of the stock drops to a value below the "buy" order for instance 347. The keyboard operator then depresses keys 3, 4 and 7 of the hundreds, tens and units banks 33, 34 and 35 respectively and the stock key S1. The same relays of both the "buy" and "sell" groups are operated as before but since the new price is below the "buy" order the "buy" lamp 38 should be operated to indicate this fact to the order clerk. The circuit of this lamp may be traced from ground 41 through the contacts of pair 39 of hundreds key 3 to the third conductor of cable 42, thence to the third level of tongues of the hundreds "sell" relays HSR and the corresponding contact of the number 3 relay of this group to the diagonal conductor 45 and by way of the contacts of pair 39 of the tens key 4 to the number 4 conductor of cable 46 and thence to the fourth row of tongues of the tens "sell" relays TSR and the corresponding contact of the number 7 relay thereof to the conductor 43, to the contacts of pair 40 of hundreds key 3 to conductor 3 of cable 44 and to the third level of tongues of the hundreds "buy" relays BHR and the corresponding fixed contact of the number 3 relay of this group to the diagonal conductor 47 and thence to the contacts of pair 40 of the tens key 4 to the fourth conductor of cable 48 and to the fourth row of tongues of the tens "buy" relays BTR and the corresponding contact of the number 4 relay thereof to the diagonal conductor 51 and thence to the contacts of pair 40 of the hundreds key 7 to the number 7 conductor of cable 52 and thence to the number 7 row of tongues to the hundreds "buy" relays BUR and the corresponding fixed contact of the number 8 relay of this group to conductor 57 and through the "buy" lamp 38 to grounded battery.

The order clerk receiving the signal to buy takes the necessary steps to have the order executed.

If instead of a decrease in price the price had increased to a value above that indicated on the "sell" switches of group 1, for instance the price of 375, then the depression of the 3, 7 and 5 keys of the hundreds, tens and units banks 33, 34 and 35 would have resulted in the operation of the "sell" lamp 36. The circuit for this lamp may be traced from ground 41 through the lower contacts of the hundreds key 3 and the number 3 conductor of cable 42 to the third level of tongues of the hundreds "sell" relays HSR and the contact of the number 3 relay to the diagonal conductor 45 and thence through the lower contacts of the tens key 7 of the number 7 conductor of cable 46 to the seventh row of tongues of the tens "sell" relays TSR and the cooperating contact of the number 7 relay of this group to the diagonal conductor 49 and thence through the lower pair of contacts of the units key 5 to the number 5 conductor of cable 50 and to the fifth level of tongues of the units relays USR and through the contact of the number 2 relay of this group to conductor 54 and through the "sell" lamp 36 to grounded battery.

Two other conditions are possible, namely when the price of the stock is the same as the "buy" order or the same as the "sell" order. In the former case the "buy" lamp 38 will operate and in the latter case the "sell" lamp 36 will operate. The circuits under these conditions may be traced in the manner indicated above, the return circuit for the "buy" lamp 38 being completed through the conductor 55 and switch 60 and the return circuit for the "sell" lamp 36 being completed through the conductor 53 and switch 61.

The purpose of the switches 60 and 61 is to enable either the "buy" or "sell" lamps to operate when the price set up on the keyboard corresponds to that set up in either the "buy" or "sell" switches of the stock or under such condition to operate the mid lamp 37. For instance where the system is used to indicate new high and low values of a stock, the previous high and low is set up on the "sell" and "buy" switches of a group and whenever a new high or low is indicated by the operation of either the lamp 38 or 36, the new high or low is manually set up on the switches of the corresponding group. If the previous high or low is equalled but not exceeded it is obvious that no new setting of the switches is required and in such case no high or low signal should be given. Consequently under this condition it is desirable to have the mid lamp 37 operate rather than either the lamps 38 or 36. By throwing the switches 60 and 61 to the opposite position to that shown this is accomplished.

While I have shown but two groups of switches in Figure 4, it is to be understood that any number of groups may be provided and multiplied to the cabled conductors SH2, ST2, SV2, BH2, BT2 and BV2, through individual relays 6R, a separate selecting key S being provided for each of such relays. Also in addition to the hundreds, tens and units switches shown in Figure 4, the system may be extended to include a fraction switch for the "sell" and "buy" prices of each group. This will require fractions keys on the keyboard and a group of fractions relays in Figs. 6 and 7, with appropriate circuit extensions therethrough.

In Figures 1, 2 and 3 I have shown the number compared with a single predetermined number and in Figures 4 to 7, with two previously determined numbers. It is to be understood, however, that it may be compared with more than two predetermined numbers by increasing the number of rows of switches in each group and providing additional relay groups, such as shown in Fig. 6 for each additional row of switches.

It will be noted, therefore, that I have provided a system whereby any number may be compared with one or more previously determined numbers which are unknown to the operator and that a signal is operated to indicate to the operator whether the number to be compared is greater or less than either of the previously determined numbers or midway between them or equal to either thereof.

It is obvious that other applications of the principles herein described than those specifically recited will occur to persons skilled in the art and therefore I do not desire to be limited to the particular embodiments disclosed but contemplate all such variations and modifications as come within the scope of the appended claims.

What I claim is:

1. In a numerical comparator system for comparing a plurality of items, a source of operating potential therefor, a plurality of groups of storage devices, each group having means individual to different values of an item and selectively operable to set up given values of said item, and means including electromagnetic devices and contact elements therefor operable in accordance with the instant value of the item and comprising an electrical operating circuit and a source of actuating potential therefor invariably equal to said operating potential, for indicating whether the instant value of said item has equaled or passed the higher of said first values, has equaled or passed below the lower thereof, or is intermediate said values.

2. In a numerical comparator system for comparing a plurality of items, a source of operating potential therefor, a plurality of groups of storage devices, each group having means individual to different values of an item and selectively operable to set up given values of said item, and means including electro-magnetic devices and contact elements therefor operable in accordance with the instant value of the item and comprising an electrical operating circuit and a source of actuating potential therefor having a magnitude and polarity equal to said source of operating potential, for indicating whether the instant value of said item equals either of said first values and when it is intermediate in value thereto.

3. A numerical comparator system for comparing a plurality of items, comprising a source of operating potential therefor, a plurality of groups of storage devices, each group having means individual to previously established high and low values of the item, means for selectively operating said devices to store previously established high and low values of the item, means operable in accordance with the instant value of each item, and means including an electrical operating circuit and a source of actuating potential therefor equal to said operating potential, for indicating whether the instant value of the item is equal to or above the previously established high or equal to or below the previously established low value of the item.

4. In a numerical comparator, a plurality of storage devices operable in accordance with predetermined numerical values of an item, means for selectively operating said devices to store predetermined numerical values of said item, other means operable in accordance with a number to be compared with said numerical values, signal means, a source of potential for operating said signal means, and means including a series circuit from said source of potential completed jointly by each of said storage devices and said other means, for operating said signal means when one of a plurality of predetermined relations exists between said number and said predetermined values of the item.

5. In a numerical comparator, a plurality of storage devices having selectively operable contact elements, means for operating selected contact elements of the storage devices for setting up predetermined numbers in each of said storage devices, a signal device, a keyboard mechanism upon which numbers may be set up and a single series circuit including said keyboard mechanism, operated contact elements of said storage devices and said signal device for determining whether the number on the keyboard is higher than that set up in one of said storage devices.

6. In a numerical comparator, a number of storage devices, means for setting up predetermined numbers in each of said storage devices, a signal device, a keyboard mechanism upon which numbers may be set up, secondary storage means common to all of said storage devices, selection means for connecting said secondary storage means with a predetermined storage device and means including a single series circuit comprising the keyboard, said storage means and said signal device for indicating whether the number on the keyboard is higher than that set up on the selected storage device.

7. In a numerical comparator, selectable storage devices for a plurality of items, each of said storage devices having a plurality of settable positions corresponding to predetermined values of the item, comparing means comprising a plurality of relays and contact elements controlled thereby, said comparing means being common to all of said storage devices and arranged for operation in accordance with other values of the items, and means including a signal device and a registering mechanism associated with said comparing means for completing a single series circuit through selected contact elements of said comparing means including said registering mechanism and said signal device when the number set up on the registering mechanism is the same value as the number set up on the selected storage device.

8. In a numerical comparator, a plurality of groups of storage devices, each group being individual to a particular item of information, means for setting up information in numerical form in each of said groups of storage devices, secondary storage means common to all of said groups of storage devices, a selective mechanism common to all of said groups of storage devices upon which other information in numerical form may be set up, means included in said selective mechanism for selecting any one of said groups of storage devices and for operating said common storage means in accordance with the selected group, and means comprising a single series circuit including said selective mechanism and contact elements of selected ones of the common storage means for indicating a certain numerical relation between the information set up in the selective mechanism and that set up in the selected storage device.

9. In a numerical comparator, means for setting up information in numerical form including a plurality of multi-contact devices, means for preparing selective circuits through said devices in accordance with a numerical quantity, a signal device, a keyboard for preparing a plurality of additional circuits to said signal device in accordance with a numerical quantity, relay means controlled solely by said first circuits and independently of said additional circuits for completing one of said additional circuits, and means in said completed circuit including said signal device and contact elements of said relay means for indicating a certain numerical relation of the numbers represented by said multi-contact device and said keyboard.

10. In a numerical comparator, means for setting up information in numerical form including a plurality of multi-contact devices, means for preparing selective circuits through said devices in accordance with a numerical quantity, a keyboard for preparing a plurality of additional circuits in accordance with a numerical quantity, selective means having contact elements controlled by said first circuits for completing a single one of said additional circuits through the keyboard, and means in said completed circuit including said contact elements for indicating a certain numerical relation of the numbers represented by said multi-contact device and said keyboard.

11. In a numerical comparator, contact means adapted to be closed selectively in accordance with a numerical quantity, means for closing said contact means to set up a given number, a second contact means also adapted to be closed in accordance with a numerical quantity, a plurality of relays operable solely in accordance with the selective closing of said first contact means, a plurality of indicators, and a single series circuit including one of said indicators, said second contact means and the contacts of said relays for operating said one of said indicators depending on a certain numerical relation of the numbers represented by said first and second contact devices.

12. In a numerical comparator, a plurality of contact means, one individual to each of a plurality of items, each of said contact means being closable selectively in accordance with a predetermined value of the item represented thereby, a device common to said contact means arranged to be operated in accordance with predetermined numbers, means also included in said device for selecting one of said contact means, said last means permitting said selection to be maintained throughout a plurality of successive operations of said devices, indicator means and means controlled jointly by said device and said selected contact means upon each operation of said device for operating said indicator means to indicate a certain numerical relation of each of the numbers successively represented by said device and said selected contact means, respectively.

13. In a numerical comparator, a plurality of contact means, one individual to each of a plurality of items, each of said contact means being closable selectively in accordance with a predetermined value of the item represented thereby, a device common to said contact means arranged to be operated in accordance with predetermined numbers, means associated with said device for selecting one of said contact means, indicator means, a plurality of relays common to said contact means and controlled by said selected contact means to store the value represented by said selected contact means, and a single series circuit including said device and the contacts of said relays for operating said indicator means to indicate a certain numerical relation of the numbers represented by said device and said selected contact means respectively.

14. In a numerical comparator, a plurality of contact means, one individual to each of a plurality of items, each of said contact means being closable selectively in accordance with a predetermined value of the item represented thereby, a keyboard mechanism common to said contact means arranged to be operated in accordance with predetermined numbers, means also included in said keyboard for selecting one of said contact means, indicator means, and comparison means controlled jointly by a single series circuit including said keyboard mechanism and the selected contact means for operating said indicator means to indicate whether the number represented by said keyboard is as high or higher, or as low or lower, in value than the value of the item represented by said selected contact means.

JOHN A. HERBST.

DISCLAIMER 2,074,392.—*John A. Herbst*, Rivervale, N. J. NUMERICAL COMPARATOR. Patent dated March 23, 1937. Disclaimer filed April 8, 1938, by the assignee, *The Teleregister Corporation*.

Hereby enters this disclaimer to claims 4, 5, and 12 of the patent.

[*Official Gazette May 10, 1938*.]